United States Patent
Horsley et al.

(10) Patent No.: US 10,091,022 B2
(45) Date of Patent: Oct. 2, 2018

(54) CREATING A CHANNEL FOR TRANSMITTING DATA OF A DIGITAL SUBSCRIBER LINE

(71) Applicant: British Telecommunications Public Limited Company, London (GB)

(72) Inventors: Ian Horsley, London (GB); Leslie Humphrey, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/504,795

(22) PCT Filed: Aug. 18, 2015

(86) PCT No.: PCT/EP2015/068941
§ 371 (c)(1),
(2) Date: Feb. 17, 2017

(87) PCT Pub. No.: WO2016/045877
PCT Pub. Date: Mar. 31, 2016

(65) Prior Publication Data
US 2017/0279634 A1    Sep. 28, 2017

(30) Foreign Application Priority Data

Sep. 22, 2014   (EP) .................................... 14275196

(51) Int. Cl.
*H04L 12/28* (2006.01)
*H04M 11/06* (2006.01)
(Continued)

(52) U.S. Cl.
CPC ........ *H04L 12/2869* (2013.01); *H04L 5/0042* (2013.01); *H04L 5/0058* (2013.01);
(Continued)

(58) Field of Classification Search
CPC . H04L 12/2869; H04L 5/0042; H04L 5/0058; H04L 5/1435; H04L 12/66; H04M 11/062
See application file for complete search history.

(56) References Cited

U.S. PATENT DOCUMENTS 7,315,571 B1   1/2008   Heidari et al.
7,796,699 B2   9/2010   Jain et al.
(Continued)

FOREIGN PATENT DOCUMENTS

CN   1909511 A    2/2007
CN   101238645 A   8/2008
(Continued)

OTHER PUBLICATIONS

International Search Report for corresponding International Application No. PCT/EP2015/068941 dated Aug. 31, 2016; 4 pages.
(Continued)

*Primary Examiner* — Ian N Moore
*Assistant Examiner* — Latresa McCallum
(74) *Attorney, Agent, or Firm* — Amy M. Salmela; Patterson Thuente Pedersen, P.A.

(57) ABSTRACT

This disclosure includes a method, and a device for implementing the method, for creating a channel for transmitting data on a Digital Subscriber Line (DSL) connection, the method comprising: method for creating a channel for transmitting data on a Digital Subscriber Line (DSL) connection, the method comprising: defining a plurality of sets of tones, wherein each set of tones includes one or more tones used by a DSL connection; monitoring the transmission characteristics of each set of tones in the plurality of sets of tones; and creating a first channel for transmitting data on the DSL connection, including allocating a first set of tones of the plurality of sets of tones to the first channel based on the monitored transmission characteristics of the
(Continued)

first set of tones and the transmission requirements of the first channel.

14 Claims, 5 Drawing Sheets

(51) Int. Cl.
    *H04L 5/14*           (2006.01)
    *H04L 12/66*         (2006.01)
    *H04L 5/00*           (2006.01)

(52) U.S. Cl.
    CPC ............ *H04L 5/1438* (2013.01); *H04L 12/66* (2013.01); *H04M 11/062* (2013.01)

(56) References Cited

U.S. PATENT DOCUMENTS

| | | | |
|---|---|---|---|
| 7,813,434 B2 | 10/2010 | Wu et al. | |
| 2002/0054578 A1* | 5/2002 | Zhang ................... | H04L 1/0001 370/328 |
| 2007/0124624 A1 | 5/2007 | Starr | |
| 2008/0159298 A1* | 7/2008 | Peterson ................ | H04L 12/66 370/395.53 |
| 2008/0212589 A1 | 9/2008 | Yang | |
| 2008/0219290 A1 | 9/2008 | Cioffi et al. | |
| 2010/0098188 A1 | 4/2010 | Starr | |
| 2011/0110359 A1* | 5/2011 | Cooke ................... | H04J 3/0638 370/350 |
| 2016/0204914 A1* | 7/2016 | Agee .................... | H04B 7/0413 370/329 |
| 2017/0085719 A1 | 3/2017 | Linney et al. | |
| 2017/0244446 A1 | 8/2017 | Al Rawi et al. | |

FOREIGN PATENT DOCUMENTS

| | | |
|---|---|---|
| CN | 102396160 A | 3/2012 |
| WO | WO 2014/122118 A1 | 8/2014 |

OTHER PUBLICATIONS

Written Opinion of the International Searching Authority for corresponding International Application No. PCT/EP2015/068941 dated Oct. 19, 2015; 5 pages.
Written Opinion of the International Preliminary Examining Authority for corresponding International Application No. PCT/EP2015/068941 dated Aug. 31, 2016; 5 pages.
International Preliminary Report in Patentability for corresponding International Application No. PCT/EP2015/068941 dated Jan. 3, 2017; 13 pages.
Extended European Search Report for corresponding EP Patent Application No. 14275196.5 dated Mar. 6, 2015; 6 pages.
International Telecommunication Union, "ITU-T G.992.5; Series G: Transmission Systems and Media, Digital Systems and Networks; Digital sections and digital line system—Access networks; Asymmetric digital subscriber line transceivers 2 (ADSL2)—Extended bandwidth (ADSL2plus)," (Jan. 2009); 110 pages.
International Telecommunication Union, "ITU-T G.992.1; Series G: Transmission Systems and Media, Digital Systems and Networks; Digital transmission systems—Digital section and digital line system—Access networks; Asymmetric digital subscriber line (ADSL) transceivers," (Jun. 1999); 256 pages.
International Telecommunication Union, "ITU-T G.993.2, Amendment 5; Series G: Transmission Systems and Media, Digital Systems and Networks; Digital section and digital line system—Metallic access networks; Very high speed digital subscriber line transceivers (VDSL2); Amendment 5: Short reach VDSL2 with reduced power and enhanced data rate," (Jan. 2014); 10 pages.
International Telecommunication Union, "ITU-T G.992.3; Series G: Transmission Systems and Media, Digital Systems and Networks; Digital sections and digital line system—Access networks; Asymmetric digital subscriber line transceivers (ADSL2)," (Apr. 2009); 404 pages.
Cioffi et al., "Band preference in dynamic spectrum management," 2004 12th European Signal Processing Conference, Vienna, 2004, pp. 1205-1208.
Chinese Search Report for corresponding CN Application No. 201580050864.7; dated Sep. 28, 2017; 11 pages with translation.

* cited by examiner

| Priority Value, $p$ | Service Type | Transmission Characteristic Priority | Bandwidth, Mbps | Error Tolerance (MTBE), s | Latency Tolerance, ms | Delay Variation Tolerance, ms |
|---|---|---|---|---|---|---|
| 1 | Voice over IP | Latency | 5 | 300 | 30 | 10 |
| 2 | Video on Demand | Error Rate | 30 | 3600 | 70 | 30 |
| 3 | Gaming | Latency | 10 | 300 | 50 | 20 |

Figure 3

| Priority Value, $p$ | Service Type | Transmission Characteristic Priority | Bandwidth, $Mbps$ | Error Tolerance (MTBE), $s$ | Latency Tolerance, $ms$ | Delay Variation Tolerance, $ms$ |
|---|---|---|---|---|---|---|
| 1 | Voice over IP | Latency | 10 | 300 | 30 | 10 |
| 2 | Video on Demand | Error Rate | 30 | 3600 | 70 | 30 |
| 3 | Gaming | Latency | 1 | 300 | 50 | 20 |

First List: Expected Services during First Time Period, 8am-5pm

| Priority Value, $p$ | Service Type | Transmission Characteristic Priority | Bandwidth, $Mbps$ | Error Tolerance (MTBE), $s$ | Latency Tolerance, $ms$ | Delay Variation Tolerance, $ms$ |
|---|---|---|---|---|---|---|
| 1 | Video on Demand | Error Rate | 70 | 3600 | 70 | 30 |
| 2 | Voice over IP | Latency | 5 | 300 | 30 | 10 |
| 3 | Gaming | Latency | 5 | 300 | 50 | 20 |

Second List: Expected Services during Second Time Period, 5pm-8am

Figure 5

CREATING A CHANNEL FOR TRANSMITTING DATA OF A DIGITAL SUBSCRIBER LINE

CROSS-REFERENCE TO RELATED APPLICATIONS

The present application is a National Phase entry of PCT Application No. PCT/EP2015/068941, filed on 18 Aug. 2015, which claims priority to EP Patent Application No. 14275196.5, filed on 22 Sep. 2014, which are hereby fully incorporated herein by reference.

TECHNICAL FIELD

The present disclosure relates to data communication in a Digital Subscriber Line (DSL) network. In particular, but not exclusively, the present disclosure relates to providing channels for transmitting data of a particular service type over a subscriber line in a DSL network.

BACKGROUND TO THE INVENTION

Digital Subscriber Lines (DSL) are a common technology for providing digital communication over copper twisted pair subscriber lines. The term DSL (or sometimes xDSL) is an umbrella term for several similar technologies, such as ADSL, ADSL2, ADSL2+, VDSL, VDSL2, G.fast, etc.

In DSL, the frequency range is divided up into a number of carriers (sometimes referred to as bins) for carrying data bits. Typically, each carrier has the same amount of bandwidth but transmits on its own unique frequency. This transmit frequency is known as the "tone", and also acts as an identifier for its particular carrier. DSL technology has generally evolved to use wider frequency ranges to accommodate a greater level of tones and bit loading, thus giving users a greater data rate. Most standards for the various DSL technologies do not include the concept of channelization, so the whole frequency range is notionally a single channel with global configuration settings applied to it. This theoretically could compromise the operation of certain services which have distinct transmission requirements on the line (for example, Voice-over-IP (VoIP) services generally require a lower latency line than Video-On-Demand (VOD), but are relatively more tolerant to high error rates). Therefore, if the whole frequency range is subject to a high level of error protection to ensure that VOD services are of sufficient quality, the induced delay from this error protection may increase the latency on the line to an intolerable level for VoIP services.

The ITU-T G.992.1 and G.992.3 standards (the "ADSL" and "ADSL2" standards, respectively) both addressed this problem through channelization. The ADSL standard included the concept of "dual latency paths" which divided the spectrum into two channels having different configuration settings (e.g. different levels of error protection). The ADSL2 standard developed this concept further to define "multiple latency paths", in which up to four different channels could be configured with different configuration settings. Once created, the channels were applied to the line and data for a particular service was loaded onto a particular channel depending on its operational requirements.

U.S. Pat. No. 7,813,434 discusses the concept of multiple latency paths in more detail. In this disclosure, the DSL line is divided up into several channels, and the DSL modem determines the transmission characteristics of each channel. The DSL modem may then transmit data on the line by loading data onto channels having corresponding transmission characteristics (e.g. data for a VoIP service will be loaded onto a channel having low latency).

Although this feature was not commonly used in low bandwidth DSL systems, the present inventors have identified that the concept of channelization of DSL technologies can be improved (in particular for high frequency systems such as G.Fast).

SUMMARY

According to a first aspect of the disclosure, there is provided a method for creating a channel for transmitting data on a Digital Subscriber Line, DSL, connection, the method comprising: defining a plurality of sets of tones, wherein each set of tones includes one or more tones used by a DSL connection; identifying a transmission characteristic of each set of tones in the plurality of sets of tones; and defining a first channel for transmitting data on the DSL connection, including allocating a first set of tones of the plurality of sets of tones to the first channel based on the identified transmission characteristic of the first set of tones and a transmission requirement of the first channel.

In the present disclosure, the DSL connection is divided up into one or more channels each having particular transmission requirements, wherein tones across the DSL frequency spectrum may be allocated to a channel if they have commensurate transmission characteristics. Thus, a channel having low latency may be created, and only tones which are determined to have low latency are allocated to that channel. Each channel may therefore be tailor-made to a particular transmission characteristic. Thereafter, data requiring that particular transmission characteristic may be loaded onto the corresponding channel on the DSL connection.

The first channel may be for transmitting data of a first service on the DSL connection, and defining the first channel may include allocating the first set of tones of the plurality of sets of tones to the first channel based on the identified transmission characteristics of the first set of tones and the transmission requirements of the first service. In this manner, the channel may be tailored to the requirements of a particular service. Thus, the quality of the connection for services having particular transmission requirements (e.g. Voice-over-IP, which is highly dependent on a low latency line) can be improved compared to the prior art techniques of having a single set of transmission properties across the entire spectrum or several channels each with their own pre-defined transmission properties.

The method may further comprise defining a second channel for transmitting data of a second service on the DSL connection, including allocating a second set of tones of the plurality of sets of tones to the second channel based on the identified transmission characteristics of the second set of tones and the transmission requirements of the second service. Thus, the method is scalable such that a plurality of channels may be created for a plurality of services.

The first service may be assigned a higher priority than the second service, and defining the first and second channels for transmitting data of the first and second services on the DSL connection may include allocating the first set of tones of the plurality of sets of tones to the first channel and then allocating the second set of tones of the plurality of sets of tones to the second channel. Thus, the method may prioritize particular services over others and improve the quality of the connection for these services by using the tones having transmission properties most suitable for the higher priority service in preference to the lower priority service.

The first channel may be for transmitting data on the DSL connection over a first time period, wherein the first set of tones allocated to the first channel may be based on the identified transmission characteristics of the first set of tones during the first time period and the transmission requirements of the first channel during the first time period. The method may therefore define channels to be used in different time periods (which is preferable when the user has different requirements during different times of day, for example), and the tones may be allocated to a channel based on the transmission properties of the tones during those times periods.

The method may further comprise: applying error protection to the first channel, wherein the form of error protection is dependent on the transmission requirements for the first channel. For example, if the channel doesn't meet a particular error target, an error protection setting may be applied, wherein the particular error protection setting used is tailored to the requirements of that channel.

The method may further comprise: subsequently identifying new transmission characteristics of each set of tones in the plurality of sets of tones; and updating the first channel by replacing the first set of tones of the plurality of sets of tones to the first channel with a new set of tones of the plurality of sets of tones, based on the transmission characteristics of the new set of tones and the transmission requirements for the first channel. The method may therefore update the channel to use the most suitable tones as the transmission properties of the tones vary over time.

A computer program is also provided containing computer-executable code which, when executed on a computer, causes the computer to perform the method of the first aspect of the disclosure.

According to a second aspect of the disclosure, there is provided a device for creating a channel for transmitting data on a Digital Subscriber Line, DSL, connection, the device comprising a processor adapted to: identify a transmission characteristic of each of a plurality of sets of tones on the DSL connection, wherein each set of tones includes one or more tones used by a DSL connection; and to define a first channel for transmitting data on the DSL connection by allocating a first set of tones of the plurality of sets of tones to the first channel based on the transmission characteristic of the first set of tones and a transmission requirement of the first channel.

The first channel may be for transmitting data of a first service on the DSL connection, and the processor may be adapted to define the first channel by allocating the first set of tones of the plurality of sets of tones to the first channel based on the transmission characteristics of the first set of tones and the transmission requirements of the first service.

The device may further comprise: a monitoring module adapted to monitor the transmission characteristics of the plurality of sets of tones on the DSL connection, wherein the processor may receive the transmission characteristics of the plurality of sets of tones from the monitoring module.

The processor may be further configured to: define a second channel for transmitting data of a second service on the DSL connection, including allocating a second set of tones of the plurality of sets of tones to the second channel based on the identified transmission characteristics of the second set of tones and the transmission requirements of the second service.

The first service may be assigned a higher priority than the second service, and the processor may be adapted to create the first and second channels for transmitting data of the first and second services on the DSL connection by allocating the first set of tones of the plurality of sets of tones to the first channel and then allocating the second set of tones of the plurality of sets of tones to the second channel.

The first channel may be for transmitting data on the DSL connection over a first time period, and the processor may be adapted to define the first channel by allocating the first set of tones to the first channel based on the transmission characteristics of the first set of tones during the first time period and the transmission requirements of the first channel during the first time period.

The processor may be further adapted to: apply error protection to the first channel, wherein the form of error protection is dependent on the transmission requirements for the first channel.

The processor may be further adapted to: subsequently identify new transmission characteristics of each set of tones in the plurality of sets of tones; and update the first channel by replacing the first set of tones of the plurality of sets of tones to the first channel with a new set of tones of the plurality of sets of tones, based on the transmission characteristics of the new set of tones and the transmission requirements for the first channel.

BRIEF DESCRIPTION OF THE FIGURES

In order that the present disclosure may be better understood, embodiments thereof will now be described, by way of example only, with reference to the accompanying drawings in which:

FIG. 3 is an example list of expected services on the subscriber line of FIG. 1.

FIG. 5 illustrates a first and second list of expected services on the subscriber line of FIG. 1, wherein each list is used during a different time period.

DETAILED DESCRIPTION OF EMBODIMENTS

Figure 1:
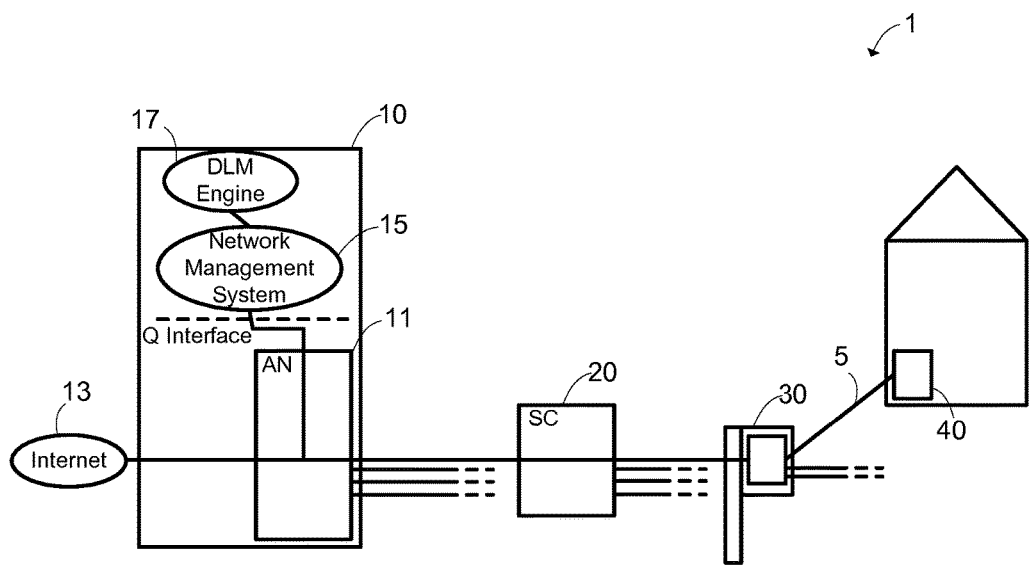
FIG. 1 is a schematic diagram of a Digital Subscriber Line (DSL) network of a first embodiment of the present disclosure, including a subscriber line.

An embodiment of a DSL network 1 of the present disclosure will now be described with reference to FIG. 1. The DSL network 1 includes a subscriber line 5, which includes a broadband connection between an exchange 10 (or "Central Office", in US terminology), and a distribution point 30 (in this case, via a street cabinet 20), and a DSL connection between the Distribution Point (DP) 30 and a Customer Premises Equipment (CPE) 40 in the customer's premises. The DSL connection is provided over a twisted copper pair subscriber line between a first DSL modem in the distribution point 30 (typically part of a Digital Subscriber Line Access Multiplier, DSLAM) and a second DSL modem in the CPE 40. This form of subscriber line is often referred to as a Fiber-To-The-DP connection, and in this embodiment uses a frequency spectrum ranging up to 106 Mhz.

In the exchange 10, the broadband connection terminates in an Access Node 11. The Access Node 11 interconnects the subscriber line 5 with an external network 13, in this case the Internet. The Access Node 11 is also connected to a Network Management System (NMS) 15 over a Q interface, which also includes a Dynamic Line Management (DLM) engine 17. The NMS 15 and DLM engine 17 are adapted to monitor the subscriber line 5 and apply configuration settings to it (usually by sending a line profile to the DSL modems). The skilled person will understand that the exchange 10 will also terminate many other subscriber lines (including DSL connections directly connecting the exchange to the customer's premises, Fiber-To-The-Cabinet connections and other Fiber-To-The-DP connections), and the NMS 15 and DLM engine 17 are also configured to monitor these lines and apply configuration settings to them too. Furthermore, the skilled person will understand that the street cabinet and distribution point will also have a one-to-many relationship with other elements lower down in the DSL network hierarchy, but a one-to-one relationship is shown in this example.

For the purposes of this description, the DLM engine 17 will hereinafter be described as the entity for monitoring and acting on the subscriber line 5 and includes memory and processing modules for carrying out a method of the present disclosure.

Figure 2:
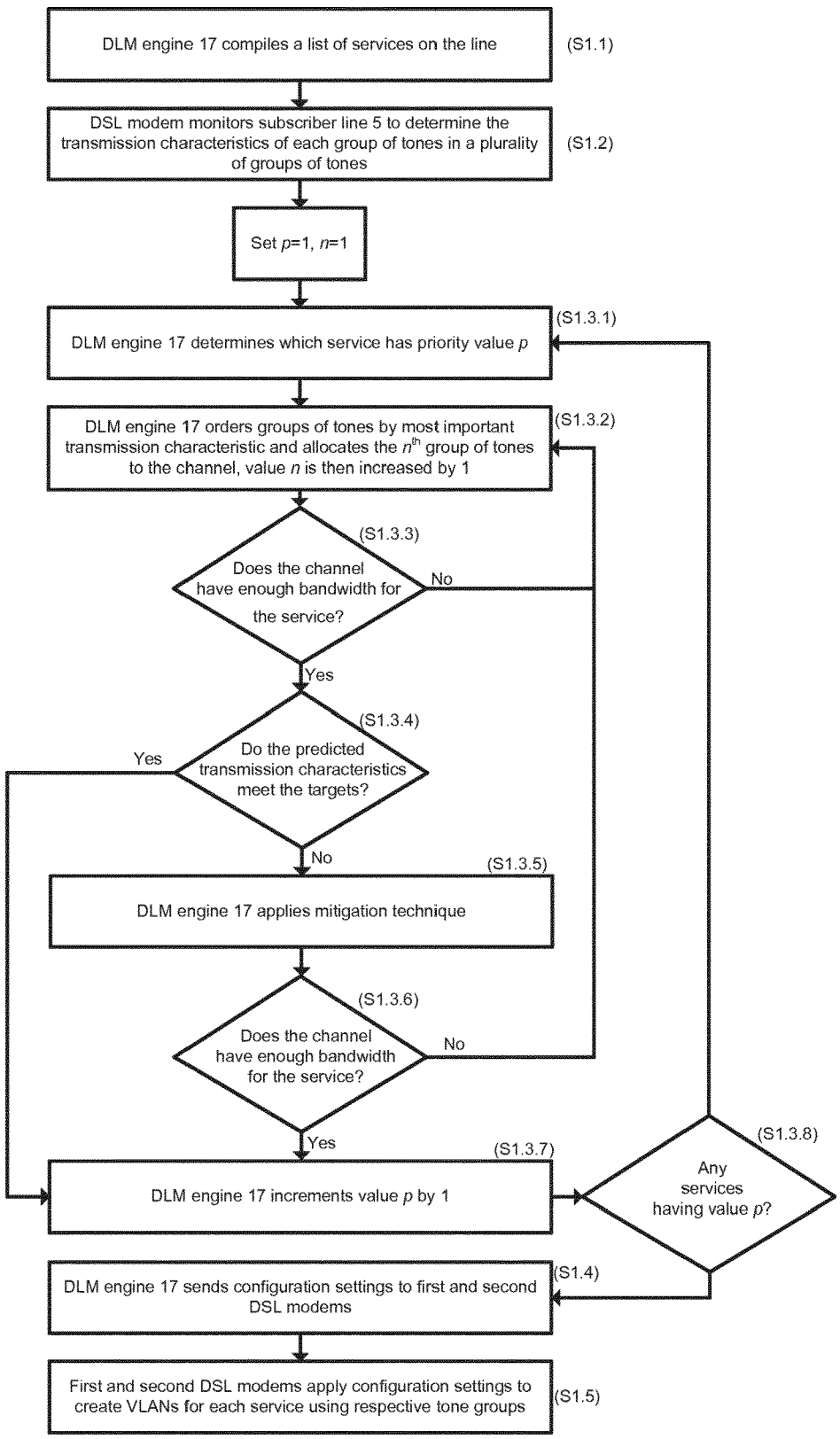
FIG. 2 is a flow diagram illustrating a first embodiment of a method of the present disclosure.

A first embodiment of a method of the present disclosure will now be described with reference to FIGS. 2 to 3. In S1.1, the DLM engine 17 is configured to compile a list of expected services on the line with their corresponding requirements. An example list is illustrated in FIG. 3, which shows three services—VoIP, VOD, and gaming. The list also includes a service priority value for each service (i.e. indicating the priority of this service to an end user), a transmission characteristic priority indication for each service (i.e. indicating the most important transmission characteristic for each service), and each service's bandwidth requirements, error tolerance, latency tolerance and delay variation (also known as "jitter") tolerance. As shown in the Figure, VoIP requires 5 Mbps of bandwidth, less than 30 ms latency, less than 10 ms of delay variation, and a Mean-Time-Between-Error (MTBE) of less than 300 seconds, whereas VOD requires 30 Mbps of bandwidth, less than 70 ms latency, less than 30 ms delay variation, and a MTBE value of 3600 seconds. The most important transmission characteristics for VoIP and VOD are latency and error rate respectively. The skilled person will understand that delay variation is also an important characteristic for VoIP, although only latency will be used in this example.

In this embodiment, the DLM engine 17 is configured to compile this list of expected services by monitoring the subscriber line 5 to determine which services are used by the end user and the bandwidth requirements for each service. The list may then be created to include all these services, their respective bandwidths and the most important transmission characteristics, and typical error, latency, and delay variation requirements for these services. The service priority values for each service may be inferred from the type of usage (e.g. if the subscriber line is used for VoIP frequently during the day, it may be inferred that VoIP is the highest priority service even if it uses less bandwidth overall than other services). The list may initially be implemented by using a starting template defining common services and their typical operational requirements, which may then be updated over time as the line is monitored (for example, to update the priorities and bandwidth requirements of each service).

In S1.2, the first DSL modem (i.e. the DSL modem in distribution point 30) monitors the subscriber line 5 to determine an error count, latency and delay variation of each group of tones. These values are then reported to the DLM engine 17. The DLM engine is configured to calculate the Mean-Time-Between-Errors (MTBE) for a period of time for each group of tones based on the error count from the DSL modem.

In this embodiment, the error count (and thus the MTBE) for each group of tones is determined in the following manner. The DSL modem is adapted to group all tones in the frequency spectrum into distinct 1 MHz groups (e.g. 0-1 MHz, 1-2 MHz, etc.), and report the error rate for each group of tones for the period of time to the DLM engine 17. This is achieved by the first DSL modem implementing a modification of Impulse Noise Monitoring (INM) (originally defined in the ITU-T G.993.2 standard), wherein the tones are grouped into adjacent 1 MHz groups, each group has its own error detection checksums applied, and INM is applied to each group of tones to determine the error count for each group of tones. The results of this analysis may be stored in memory on the first DSL modem and reported to the DLM engine 17, which may then calculate the MTBE value for each group of tones. In this embodiment, the DLM engine 17 calculates the MTBE for each group of tones over a 24 hour period.

Furthermore, the latency for each group of tones may be determined by the DSL modem measuring the 'Downstream Actual Delay' for each group of tones. This may then be reported to the DLM engine 17. The DSL modem also determines the actual delay variation for each group of tones and reports this to the DLM engine 17. In this embodiment, the actual delay variation is measured using the Y.1731 protocol.

The DLM engine 17 thus has a list of expected services on the subscriber line 5 and their corresponding bandwidth and transmission requirements, and data relating to the transmission characteristics (including error rate, latency and delay variation) of groups of tones across the whole frequency spectrum. The DLM engine 17 is then configured to create a channel for each service in order of their priority according to the following algorithm.

In the following iterative algorithm, a priority value, p, and group number, n, are set at 1 (this will become apparent to the reader upon review). In S1.3.1, the DLM engine 17 determines which service has the corresponding value for p. As shown in FIG. 3, the VoIP service is the highest priority service having a p value of 1, and also shows that the most important transmission characteristic for the VoIP service is latency. Accordingly, in S1.3.2, the groups of tones are ordered in ascending order of their latency and assigned the corresponding group number (such that the group of tones having the lowest latency value is assigned value n=1, the group of tones having the second lowest latency value is assigned value n=2, etc.) and the DLM engine 17 allocates the group of tones having group number 1 (i.e. having the lowest latency) to a channel for the VoIP service (the "priority one channel"). Thus, in above S1.3.2, the group of tones having group number n=1 is the first group of tones to be allocated to the channel for the VoIP service. The value for n is then increased by 1, such that in the next iteration of the method the group of tones having value n=2 will be allocated.

In S1.3.3, the DLM engine 17 determines if the newly created priority one channel has enough bandwidth to satisfy that service's requirements. If not, the process loops back to S1.3.2 and the DLM engine 17 allocates the group of tones having group number n=2 (i.e. the group of tones with the second lowest latency value) to the priority one channel. This process is repeated iteratively (by looping back from S1.3.3 to S1.3.2) until the priority one channel has been allocated enough groups of tones to meet the bandwidth requirements for the VoIP service.

In S1.3.4, the DLM engine 17 is configured to determine if the newly created channel meets the transmission requirements for the service. In this example, the DLM engine 17 therefore compares a predicted error rate for the VoIP channel (based on the MTBE for each group of tones allocated to the priority one channel) to the error target for that service, a predicted latency for the VoIP channel (based on the latency for each group of tones allocated to the priority one channel) to the latency target for that service, and a predicted delay variation for the VoIP channel (based on the delay variation for each group of tones allocated to the priority one channel) to the latency target for that service. If the predicted error rate, latency and delay variation meet the targets, then the channel creation for the priority one channel is complete and the process moves to S1.3.7. However, in this example, the predicted error rate for the VoIP channel is above the target. Accordingly, at S1.3.5, the DLM engine 17 uses an appropriate mitigation technique (in this case, an error protection setting) to bring the predicted transmission characteristics to within the targets.

In this example, the DLM engine 17 uses an error protection setting which has no impact on latency, such as Reed Solomon without interleaving (a form of Forward Error Correction), such that the priority one channel remains within the latency tolerance for the VoIP service. The extent of error protection may also be increased if a subsequent check on the predicted error rate of the priority one channel still does not meet the error target, such as by increasing the amount of FEC, whilst still having no impact on the expected latency on the channel.

Furthermore, the skilled person will understand that the use of error protection may incur an overhead penalty on the channel. Thus, at S1.3.6, the DLM engine 17 again determines if the priority one channel has enough bandwidth to satisfy that service's requirements. If not, the process loops back to S1.3.2 in order to allocate a further group of tones (having the next lowest latency value) to the channel. Thus, S1.3.2 to S1.3.6 are repeated iteratively until the channel has enough bandwidth for the service and the predicted error rate, latency and delay variation meet the error, latency and delay variation targets, at which point the process moves to S1.3.7.

In S1.3.7, the DLM engine 17 increments value p by 1 and, in S1.3.8, determines if there are any services having this new priority value. As VOD has a priority value of 2, the process loops back to 1.3.1 to create a "priority two channel" for the VOD service.

In the next iteration of S1.3.2, the DLM engine 17 determines that the most important transmission characteristic for VOD is error rate. Accordingly, the remaining groups of tones (i.e. the tones which were not allocated to the priority one channel) are reordered in ascending order of their error rate, and assigned the corresponding group number. Thus, if group numbers 1 to 3 were allocated to the priority one channel, group number 4 is assigned to the group of tones having the lowest error rate of the remaining groups of tones, group number 5 is assigned to the group of tones having the next lowest error rate of the remaining groups of tones, etc. Thus, the priority two channel is created by iteratively allocating groups of tones having the next lowest error rate to the channel until it has enough bandwidth to meet demand and meets the error, latency and delay variation targets for that channel. As before, if the predicted error rate of the priority two channel is above the error rate target for that service, an error protection setting is applied and the DLM engine 17 again determines if the channel meets the bandwidth requirements.

As shown in FIG. 3, the VOD service is very sensitive to errors, whilst being relatively tolerant to latency and delay variation. In this example, the priority two channel does not meet the error rate target for the VOD service and thus an error protection setting is applied in S1.3.5. In this embodiment, the DLM engine 17 selects from one of several error protection settings, including:
  a) No error protection;
  b) Reed Solomon and interleaving with max latency 8 ms and 0.75 ms error length correction;
  c) Reed Solomon and interleaving with max latency 16 ms and 2 ms error length correction;
  d) Reed Solomon without interleaving, overhead for RS 100%; and
  e) Physical layer retransmission.

In order to reduce the error rate to meet the target, the DLM engine 17 selects b) Reed Solomon and interleaving with max latency 8 ms and 0.75 ms error length correction. Although this increases the latency and overhead of the channel, it is still within the latency and bandwidth targets of the service.

Furthermore, in S1.3.4, the DLM engine 17 determines if the latency and/or delay variation of the priority two channel meets the latency and delay variation targets. Although it is unlikely that the priority two channel will not meet these targets (as the latency and delay variation targets are relatively lenient for the VOD service), the DLM engine 17 can reduce the latency and/or delay variation for the priority two line by exchanging a group of tones that has been allocated to the priority two channel with another group of tones that has a similar error rate but lower latency and/or delay variation (from the remaining groups of tones or even one allocated to the priority one channel).

Once the priority two channel has been created, the DLM engine 17 then increases value p by 1 and loops back to S1.3.1 to create a "priority three channel" for the third highest priority service. Thus, channels are created for each service, wherein each channel's transmission characteristics are based on the transmission requirements for that channel (and also taking into account how important that service is to the end user).

Once the DLM engine 17 has created a channel for each service (i.e. the DLM engine 17 increases the value of p by 1 and determines that there are no services having this value), the process moves to S1.4 in which the DLM engine 17 sends the configuration settings for the channels in the form of a line profile (along with all other configuration settings defined by the DLM engine) to the first and second DSL modems of the subscriber line 5. The line profile indicates which groups of tones to use for each service (e.g. 40-41 MHz and 53-54 MHz for VoIP, 42-43 MHz, 43-44 MHz, 44-45 MHz, 81-82 MHz and 84-54 MHz for VOD, and so on.). The first and second DSL modems may then retrain to apply the new line profile (S1.5) by building VLANs for each channel. This is achieved, in this embodiment, by the Network Management System 15 which configures the VLANs for each service (using appropriate parameters such as Constant Information Rate and Peak Information Rate).

Thereafter, the DSL modems may transmit data of a particular service via a particular channel by determining the service type for the data and transmitting the data via the VLAN associated with that service. Accordingly, the DSL modems include a traffic mapping module adapted to map the VLAN identifiers to the respective physical layer path at the PMS-TC layer. Furthermore, the traffic mapping module may also be configured to only map the data when the DSL line is operating near or at its maximum capacity, such that traffic of a lower priority service type may use the full capacity of the DSL line, until data of a higher priority service is transmitted (at which point the channel is reserved for the exclusive transmission of data of that service).

The skilled person will understand that there will most likely be groups of tones remaining after the first, second and third channels have been created. These remaining tones may be used by any service on the DSL line.

In the above example, the VoIP service is the highest priority service and a channel for this service is created first using the groups of tones with the lowest latency. However, the skilled person will understand this is only an example and that other services may be the highest priority service for a particular user. In another example, the VOD service is the highest priority service, and thus gets allocated the groups of tones with the lowest error rates (as error rate is the most important transmission characteristic for VOD) to its corresponding channel. Thereafter, when the DLM engine 17 creates a channel for the VoIP service, there is an increased likelihood that the predicted error rate is greater than the error rate tolerance threshold and thus error protection settings must be applied to the line to compensate for this. In this scenario, the DLM engine 17 may use greater levels of FEC until the predicted error rate meets the error rate target. However, the skilled person will understand that the DLM engine 17 must strike a balance between using ever increasing amounts of FEC (which incur an overhead penalty) and allocating a fair share of bandwidth between the various services. Accordingly, instead of using greater levels of FEC, the DLM engine 17 may instead be configured to reallocate a group of tones which have previously been allocated to a higher priority service to the VoIP service (such that the higher priority service is allocated the group of tones having the higher error rate), and determine if both the VoIP channel and the channel for the higher priority service then both meet the error rate, latency and delay variation targets. If not, the process may be repeated (by reallocating groups of tones from higher and higher priority services), until all channels for all services meet the transmission characteristic targets.

Figure 4:
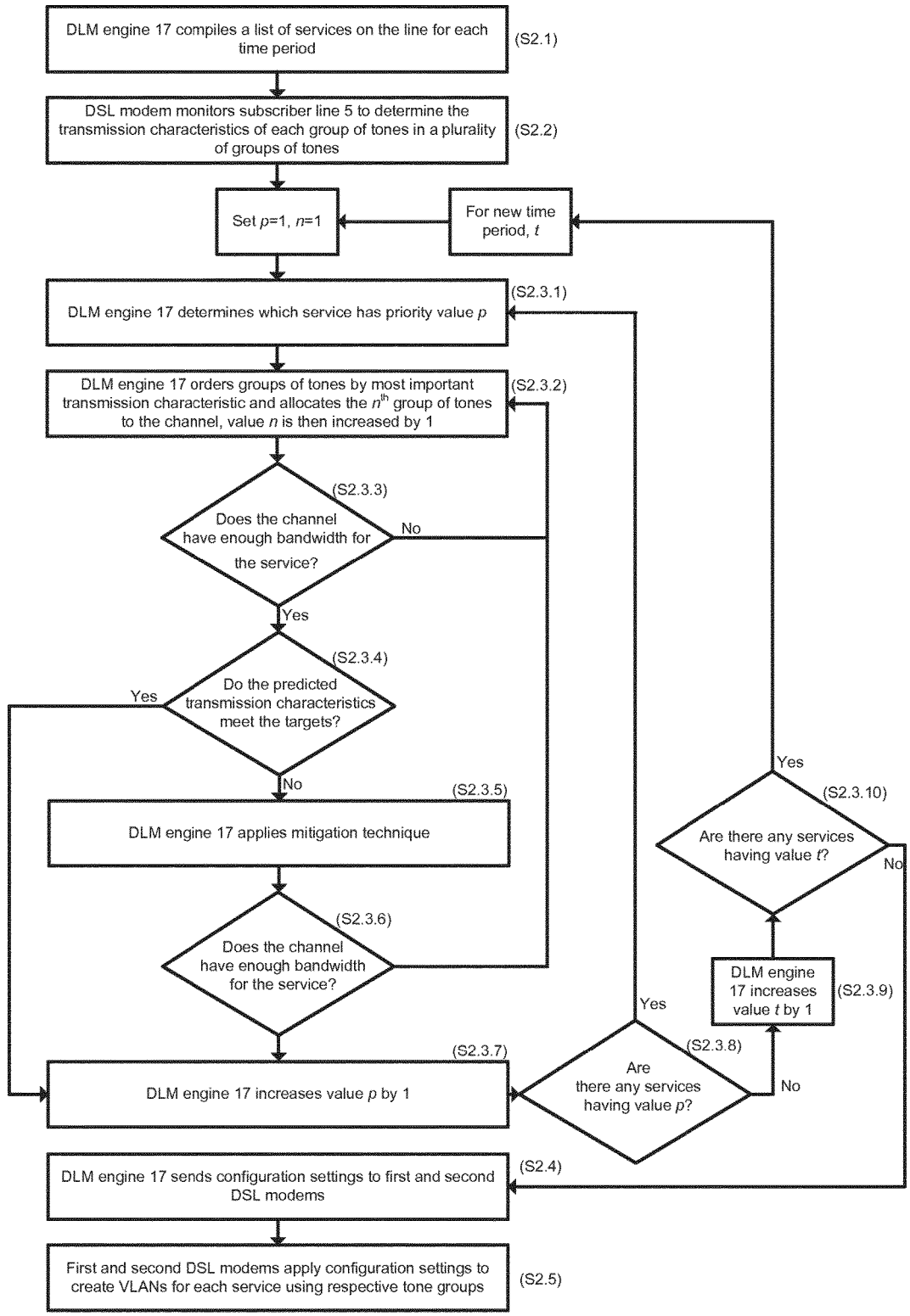
FIG. 4 is a flow diagram illustrating a second embodiment of a method of the present disclosure.

A second embodiment of a method of the present disclosure will now be described with reference to FIGS. 4 and 5. This second embodiment is similar to the first embodiment above, but creates a channel for a particular service to be used during a certain time period.

In S2.1 (see FIG. 4), the DLM engine 17 is configured to compile several lists of expected services on the line, with their corresponding service priorities, most important transmission characteristic, attributes and requirements, wherein each list relates to a particular time period. Example lists are shown in FIG. 5, which illustrates a first list of expected services on the line for Sam to 5 pm, and a second list of expected services on the line for 5 pm to 8 am. As shown in FIG. 5, the first list prioritizes VoIP services over VOD, whilst the second list prioritizes VOD over VoIP, and the respective bandwidth requirements fluctuate between the two time periods.

Returning to FIG. 4, in S2.2, the first DSL modem (i.e. the DSL modem in distribution point 30) monitors the subscriber line 5 to determine the error rate, latency and delay variation over the time periods for both the first and second lists of expected services (i.e. it monitors the line between 8 am to 5 pm to determine the error rate, latency and delay variation during this first time period, and monitors the line between 5 pm and 8 am to determine the error rate, latency and delay variation for this second time period). Again, the DSL modem is adapted to group all tones in the frequency spectrum into distinct 1 MHz groups (e.g. 0-1 MHz, 1-2 MHz, etc.), and report the error rate, latency and delay variation for each group of tones for each period of time to the DLM engine 17 (which then coverts the error rates into MTBE values). Again, the error rates are measured by the first DSL modem implementing a modification of Impulse Noise Monitoring, INM (originally defined in the ITU-T G.993.2 standard), such that the tones are grouped into adjacent 1 MHz groups, each group has its own error detection checksums applied, and INM is applied to each group of tones to determine the error rate for each group of tones. The results of this analysis may be stored in memory on the first DSL modem and reported to the DLM engine 17, which is then converted into a MTBE value.

Thus, the DLM engine 17 now has first and second lists of expected services on the subscriber line 5 (including their corresponding priorities, attributes and requirements), wherein the first and second list relate to a first and second time period respectively, and also has a report of the MTBE, latency and delay variation for each group of tones across the frequency spectrum for each time period.

The DLM engine 17 is configured to create a channel for each service for each time period, in order of their priority. This is achieved by implementing S1.3.1 to S1.3.8 recited above for the first embodiment, for each time period. Thus, starting with the first time period, the DLM engine 17 determines which service has a value p=1, which is the VoIP service (S2.3.1). In S2.3.2, the DLM engine 17 allocates the group of tones having the lowest latency in the first time period to a channel for the VoIP service (the "priority one channel"). In S2.3.3, the DLM engine 17 determines if the newly created priority one channel has enough bandwidth to satisfy that service's requirements. If not, the process loops back to S2.3.2 and the DLM engine 17 allocates the group of tones having the second lowest latency for the first time period to the priority one channel. This process is repeated iteratively (by looping back from S2.3.3 to S2.3.2) until the priority one channel has been allocated enough groups of tones to meet the bandwidth requirements for the VoIP service for the first time period.

As in the first embodiment, the DLM engine 17 determines if the priority one channel meets the error, latency and delay variation targets for the VoIP service for the first time period (S2.3.4). If it does, then the priority one channel is created and the process moves to S2.3.7. If the priority one channel does not meet one of the targets, then a mitigation technique is used in S2.3.5 (e.g. the DLM engine 17 applies an error protection setting to the priority one channel) and determines if the priority one channel still has enough bandwidth for the service (S2.3.6).

Thus, the DLM engine 17 creates a channel for the VoIP service for the first time period. This is repeated for all remaining services in the first time period in the same manner as the first embodiment (i.e. by increasing the value p by 1 in S2.3.7, determining if there are any further services in the list of expected services for the first time period having that value of p in S2.3.8, and if so, looping back to S2.3.1).

Once the DLM engine 17 has created channels for each service for the first time period, the DLM engine 17 then repeats the process for the second time period. As shown in FIG. 4, this is achieved by the process initially having a time period value, t, of 1 (which relates to the list of expected services for the first time period), and once channels have been created for all services in the first time period (such that the DLM engine determines is S2.3.8 that there are no further services having value p), the DLM engine 17 increments the value for t by 1 (S2.3.9) and determines if there are any further lists of expected services having this time period value (S2.3.10). If so, the DLM engine resets the values for p and n to 1 and the S2.3.1 to S2.3.8 are repeated for all services of this time period (wherein the values for p and n now relate to the priority and group number values relative to the second list of expected services and the transmission characteristics during the second time period respectively). Once the DLM engine 17 has created channels for each service for each time period (i.e. the DLM engine 17 increases the value of t and determines that there are no lists of expected services having this time period), then the process moves to S2.4.

As in the first embodiment, the DLM engine 17 sends configuration settings in the form of a line profile to the DSL modems of the subscriber line 5 (S2.4). These configuration settings define the groups of tones to use for each service, and the time periods to use these groups of tones. The first and second DSL modems may then retrain to apply the new line profile (S2.5) and build VLANs for each service for each time period using the respective tone groups. Thereafter, the DSL modems transmit data by determining the service type for the data, and transmitting the data via the VLAN associated with that service and the current time period (using a traffic mapping module in the DSL modems).

The skilled person will understand that the present disclosure may be applied to any form of DSL network. More recent DSL technologies, such as G.fast, use much wider frequency spectrums which can experience large fluctuations in the noise environment across the range. The present disclosure is therefore particularly suitable for these modern DSL networks having wider frequency spectrums, as creating channels with transmission properties based on the requirements of a service is much more preferable than using a single set of configuration settings for the line (which would have a greater compensatory effect when the frequency range is larger and there is a greater amount of variation in the noise environment across this range).

In the above embodiments, the DSL modem in the DSLAM in the distribution point 30 monitors the line and reports these measurements to the DLM engine 17 in the exchange 10, which then creates the channels and sends the respective configuration settings to the DSL modems. The skilled person will understand that this particular architecture is only one example of implementing embodiments of the disclosure, such that it could be put into practice in a single entity or other forms of distributed architectures. For example, the DSL modem could also be configured to create the channel (such that the invention could be practiced in a single entity), although it is more commonplace for DLM functions to be carried out in the core network. Furthermore, the processing modules used to carry out embodiments of the disclosure could be one or more processing modules, implemented in the same or separate entities in the network.

In the above embodiments, channels are created for services in order of their priority to the user. This is preferable as the tones with the most suitable transmission characteristics can be used for the highest priority service, ensuring the connection is operating at its best for that service. However, the skilled person will understand that it is non-essential to prioritize some services over others. Instead, the DLM engine 17 may allocate groups of tones to different services only of the monitored transmission characteristics of the group of tones and the transmission requirements of each service, without any regard to the importance of that service to the user. Furthermore, once the channel has been created for a service, the DSL modems may only use that channel exclusively for that service when the line is operating at or near maximum capacity. At other times, the channel may be shared with data for other services.

The skilled person will also understand that the above method may be applied at any time during operation of the subscriber line, and the channels may be updated over time (e.g. by continually or periodically monitoring the line and reallocating tones to the channels).

Furthermore, the skilled person will also understand that the modification of the Impulse Noise Monitoring algorithm used in the above embodiments is not the only form of error monitoring that may be used. That is, any error reporting algorithm that may be configured to report errors on distinct groups of tones in the frequency spectrum can be used. Furthermore, the skilled person will understand that there are a number of ways that the latency and delay variation metrics could be reported on distinct groups of tones. For example, Ethernet OAM or ITU Y.1731 could be used to monitor individual VLANs (which cover a particular set of groups of tones) to determine its error rate, latency, delay variation etc. The skilled person will also understand that error rate, latency and delay variation are only examples of transmission characteristics that could be used to create a channel, and that others could be used.

In the above embodiments, a multiple VLAN architecture is used such that each data for each service type can be directed to the respective VLAN which uses the groups of tones allocated to that service. However, the skilled person will also understand the use of multiple VLANs is also non-essential. For example, a single VLAN could be used and each service is allocated an 802.1p marking (i.e. 0 to 7). The traffic mapping module may then direct traffic for a service to its respective priority path according to its marking.

Furthermore, the above embodiments use a list of expected services on the line to define the transmission characteristics for each channel, which is then used to create channels for each service which have transmission properties commensurate to the requirements of those services. However, the skilled person will understand that the disclosure also applies to creating channels having particular characteristics (such as a low latency channel, low error-rate channel), and then allocating groups of tones to those channels. Thereafter, data can be loaded onto these channels if it requires that particular transmission characteristic.

The algorithm used in the above embodiments to allocate tones to the different channels involves the DLM engine 17 ordering the tones by a transmission characteristic that is deemed most important for a particular channel. However, the skilled person will understand that this particular method is non-essential. For example, ordering the group of tones may be omitted, and any group of tones which meets the transmission requirements for the channel may be allocated to that channel. Furthermore, the skilled person will understand that any tone remaining (i.e. those that have not been allocated to a channel) may be used for transmitting data of any type.

In this specification, the term "tone" is used to define a particular frequency which a DSL connection may use for transmitting data. The skilled person will understand that the frequency range for a DSL connection is typically divided up into many carriers, each having a particular bandwidth within this frequency range, and data in this carrier is transmitted at a particular frequency (known as the carrier's "tone"). However, the skilled person will understand that, in the context of this disclosure, each "tone" may be any transmit frequency within the frequency range of a DSL connection, and is not limited to a whole carrier.

The skilled person will understand that any combination of features is possible within the scope of the invention, as claimed.

The invention claimed is:

1. A method for creating a channel for transmitting data on a Digital Subscriber Line (DSL) connection, the method comprising:
   defining a plurality of sets of tones, wherein each set of tones includes one or more tones used by a DSL connection;
   identifying a transmission characteristic of each set of tones in the plurality of sets of tones;
   defining a first channel for transmitting data on the DSL connection, including allocating a first set of tones of the plurality of sets of tones to the first channel based on the identified transmission characteristic of the first set of tones and a transmission requirement of the first channel; and
   defining a second channel for transmitting data on the DSL connection, including allocating a second set of tones of the plurality of sets of tones to the second channel based on the identified transmission characteristic of the second set of tones and a transmission requirement of the second channel;
   subsequently identifying a new transmission characteristic of each set of tones in the plurality of sets of tones; and
   updating the first channel by replacing the first set of tones of the plurality of sets of tones to the first channel with a new set of tones of the plurality of sets of tones, based on the transmission characteristic of the new set of tones and the transmission requirement of the first channel.

2. A method as claimed in claim 1, wherein the first channel is for transmitting data of a first service on the DSL connection, and defining the first channel includes allocating the first set of tones of the plurality of sets of tones to the first channel based on the identified transmission characteristic of the first set of tones and a transmission requirement of the first service.

3. A method as claimed in claim 2, further comprising:
   wherein the second channel is for transmitting data of a second service on the DSL connection, and the step of defining the second channel includes allocating the second set of tones of the plurality of sets of tones to the second channel based on the identified transmission characteristic of the second set of tones and a transmission requirement of the second service.

4. A method as claimed in claim 3, wherein the first service is of a higher priority than the second service, and the steps of defining the first and second channels for transmitting data of the first and second services on the DSL connection includes allocating the first set of tones of the plurality of sets of tones to the first channel and then allocating the second set of tones of the plurality of sets of tones to the second channel.

5. A method as claimed in claim 1, wherein the first channel is for transmitting data on the DSL connection over a first time period, wherein the first set of tones of the plurality of sets of tones allocated to the first channel is based on the identified transmission characteristics of the first set of tones during the first time period and a transmission requirement of the first channel during the first time period.

6. A method as claimed in claim 1, further comprising:
   applying error protection to the first channel, wherein the form of error protection is dependent on the transmission requirement of the first channel.

7. A non-transitory computer-readable storage medium comprising computer-executable code which, when executed on a computer, causes the computer to perform the method of claim 1.

8. A device for creating a channel for transmitting data on a Digital Subscriber Line (DSL) connection, the device comprising:
   a processor adapted to:
      identify a transmission characteristic of each of a plurality of sets of tones on the DSL connection, wherein each set of tones includes one or more tones used by a DSL connection;
      define a first channel for transmitting data on the DSL connection by allocating a first set of tones of the plurality of sets of tones to the first channel based on the transmission characteristic of the first set of tones and a transmission requirement of the first channel;
      define a second channel for transmitting data on the DSL connection by allocating a second set of tones of the plurality of sets of tones to the second channel based on the transmission characteristic of the second set of tones and a transmission requirement of the second channel;
      subsequently identify a new transmission characteristic of each set of tones in the plurality of sets of tones; and
      update the first channel by replacing the first set of tones of the plurality of sets of tones to the first channel with a new set of tones of the plurality of sets of tones, based on the transmission characteristic of the new set of tones and the transmission requirement for the first channel.

9. A device as claimed in claim 8, wherein the first channel is for transmitting data of a first service on the DSL connection, and the processor is adapted to define the first channel by allocating the first set of tones of the plurality of sets of tones to the first channel based on the transmission characteristic of the first set of tones and a transmission requirement of the first service.

10. A device as claimed in claim 9, wherein the second channel is for transmitting data of a second service on the DSL connection, and the processor is further adapted to define the second channel by allocating the second set of tones of the plurality of sets of tones to the second channel based on the identified transmission characteristic of the second set of tones and a transmission requirement of the second service.

11. A device as claimed in claim 9, wherein the first service is of a higher priority than the second service, and the processor is adapted to define the first and second channels for transmitting data of the first and second services on the DSL connection by allocating the first set of tones of the plurality of sets of tones to the first channel and then allocating the second set of tones of the plurality of sets of tones to the second channel.

12. A device as claimed in claim 8, wherein the first channel is for transmitting data on the DSL connection over a first time period, and the processor is adapted to define the first channel by allocating the first set of tones to the first channel based on the transmission characteristic of the first set of tones during the first time period and a transmission requirement of the first channel during the first time period.

13. A device as claimed in claim 8, wherein the processor is further adapted to:
apply error protection to the first channel, wherein the form of error protection is dependent on the transmission requirement for the first channel.

14. A Digital Subscriber Line (DSL) modem comprising:
a first processor adapted to monitor transmission characteristics of a plurality of sets of tones on a DSL connection; and
a device for creating a channel for transmitting data on the DSL connection, the device comprising:
a second processor adapted to:
receive the transmission characteristics of the plurality of sets of tones from the first processor,
identify a transmission characteristic of each of the plurality of sets of tones on the DSL connection, wherein each set of tones includes one or more tones used by a DSL connection,
define a first channel for transmitting data on the DSL connection by allocating a first set of tones of the plurality of sets of tones to the first channel based on the transmission characteristic of the first set of tones and a transmission requirement of the first channel,
define a second channel for transmitting data on the DSL connection by allocating a second set of tones of the plurality of sets of tones to the second channel based on the transmission characteristic of the second set of tones and a transmission requirement of the second channel,
subsequently identify a new transmission characteristic of each set of tones in the plurality of sets of tones, and
update the first channel by replacing the first set of tones of the plurality of sets of tones to the first channel with a new set of tones of the plurality of sets of tones, based on the transmission characteristic of the new set of tones and the transmission requirement for the first channel.

* * * * *